Aug. 7, 1923.                                                1,464,011
J. F. MONTINE
CARRIER TRUCK
Filed Aug. 23, 1922          2 Sheets-Sheet 2
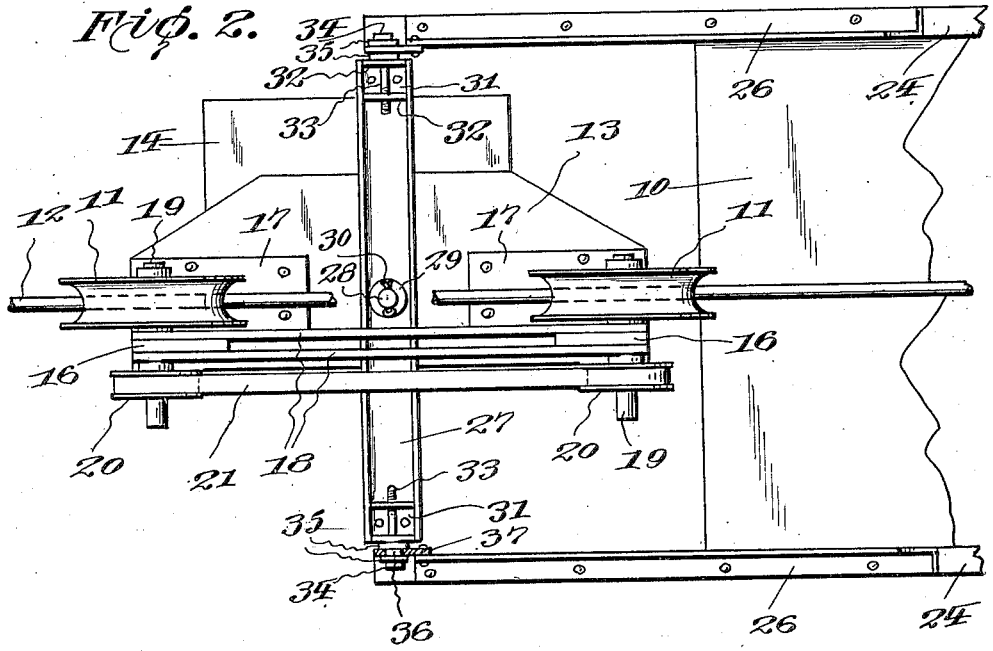
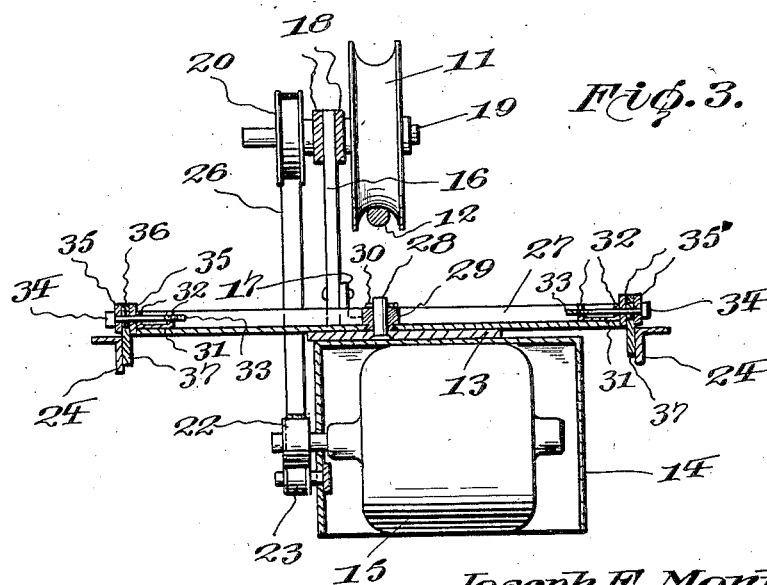
Inventor:
Joseph F. Montine.
By Milo B. Stevens & Co.
Attorneys.

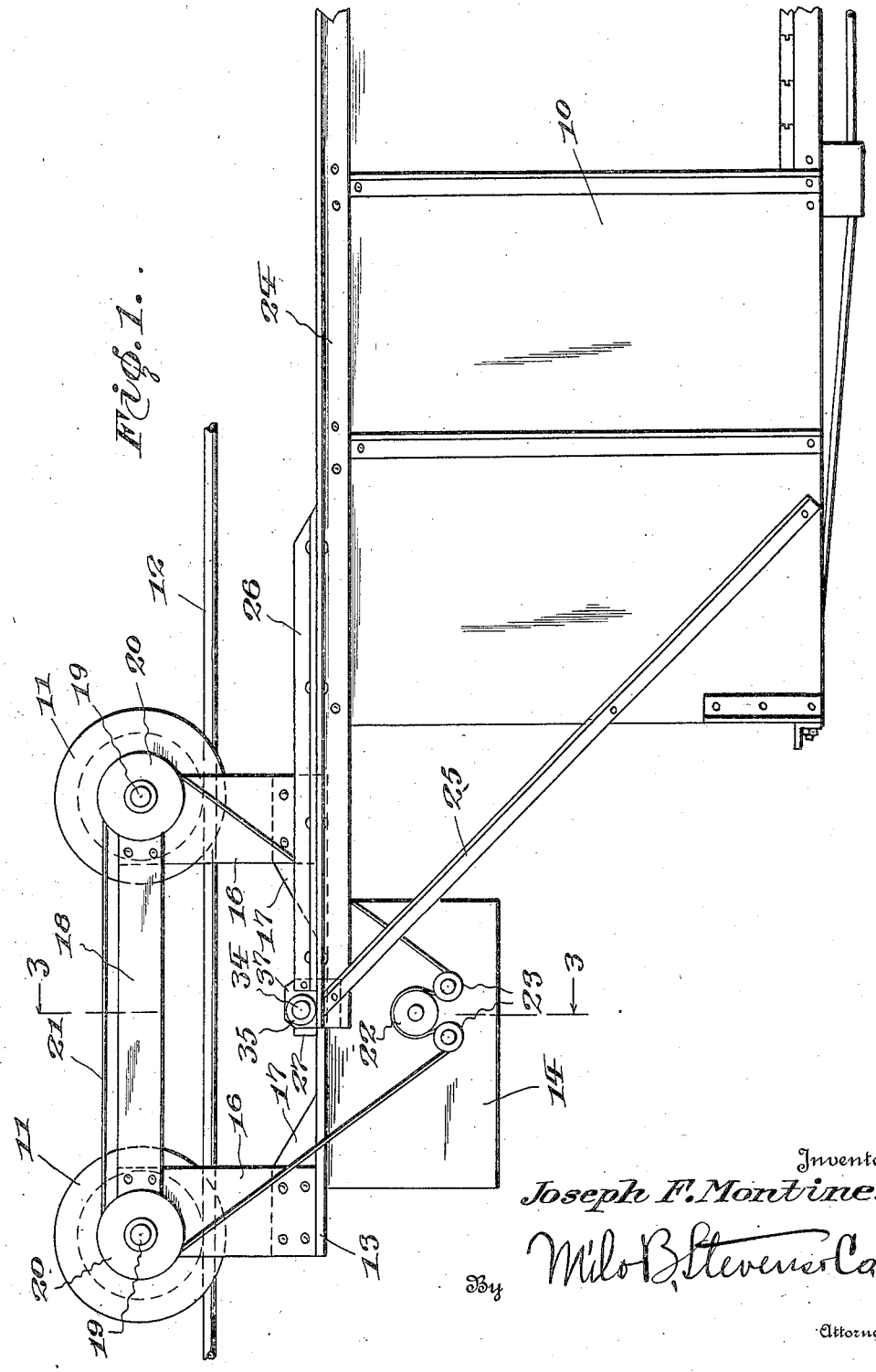

Patented Aug. 7, 1923.

1,464,011

UNITED STATES PATENT OFFICE.

JOSEPH F. MONTINE, OF CHICAGO, ILLINOIS.

CARRIER TRUCK.

Application filed August 22, 1922. Serial No. 583,835.

*To all whom it may concern:*

Be it known that I, JOSEPH F. MONTINE, a citizen of the United States, residing at Chicago, in the county of Cook and State of Illinois, have invented new and useful Improvements in Carrier Trucks, of which the following is a specification.

This invention relates to aerial tramways or transportation systems for collecting and delivering mails, merchandise, etc., along a route, the same comprising an elevated track on which is mounted for travel an electric motor driven truck carrying a receptacle containing the mail matter and the like.

The invention relates more particularly to the connection between the truck and the receptacle, and its object is to provide a connection embodying a novel and improved combination and arrangment of elements to be hereinafter described and claimed.

In order that the invention may be better understood, reference is had to the accompanying drawings, wherein:

Figure 1 is a side elevation of the structure;

Fig. 2 is a plan view, and

Fig. 3 is a cross-section on the line 3—3 of Fig. 1.

Referring specifically to the drawings, 10 denotes a fragment of the receptacle in which the mail matter, merchandise or other commodities to be transported are deposited. This receptacle is supported at each end by a truck provided with two grooved wheels 11 which run on an elevated cable track 12. One of the trucks carries an electric motor, and the other truck may be a trailer; or if desired both trucks may carry a motor for propulsion. The connections between the trucks and the receptacle is the same for both trucks, and hence only one of the trucks and its connection with the receptacle has been illustrated.

The truck comprises a base plate 13 carrying a casing or housing 14 in which the electric motor 15 is housed, and also carrying the supports for the wheels 11, these supports being upright plates 16 rigidly secured to the base plate by angle irons 17. The plates 16 are connected by horizontal and longitudinally extending brace bars 18 located on opposite sides thereof, and riveted or otherwise rigidly secured thereto. The axles 19 of the wheels 11 pass through the plates 16 and the bars 18, and are provided with pulleys 20 over which passes a belt 21 whereby the motor 15 is geared to the wheels, the motor shaft being provided with a pulley 22 over which the belt passes, and said belt being also trained over idler pulleys 23 supported by the side wall of the motor housing 14.

At the top of the receptacle 10 on each side thereof is rigidly secured a longitudinal beam 24 which projects beyond the end of the receptacle and is braced by a bar 25 extending diagonally from the receptacle to the outer end of the beam, said bar being rigidly connected to said end of the beam and to the side of the receptacle. On top of the beam 24 is mounted and rigidly secured a second beam 26 which stops short of the outer end of the former.

The beams 24 and 26 support at their outer ends a bolster 27 which is composed of a channel beam arranged transversely above the base plate 13. Midway between its ends a pivotal connection is made between the bolster and the base plate. This connection is a vertical pivot pin 28 carried by the base plate, and passing through a sleeve or boss 29 carried by the bolster, with a cotter pin or other fastener 30 passing through the pivot pin above the sleeve or lug, the latter being secured to the bottom of the channel beam forming the bolster.

At the ends of the bolster 27, in the channel thereof, are secured short channel bars 31 which are arranged transversely so as to form two upstanding transverse walls 32 in the bolster channel. Through each pair of these walls passes a pivot pin 33 which is threaded at its inner end to screw through the inner wall, and has a head 34 at its outer end. The outer end of each pivot pin 33 also carries two washers 35 and between the same a bushing 36. The outer end of each beam 26 carries a plate 37 which is apertured to seat one of the bushings 36, with the washers 35 engaging opposite sides of the plate.

The construction hereinbefore described provides a pivotal connection between the bolster 27 and its supporting beams 26, and as the pivotal axis is horizontal and transverse of the truck, the latter is free to tilt endwise, which, together with the vertical pivotal connection of truck with the bolster allows the truck to run perfectly free in following the cable track 12, especially in going around curves.

I claim:

1. A carrier for overhead transportation systems comprising a receptacle, a supporting frame carried by the receptacle, a bolster carried by said frame, and having a horizontal pivot connection therewith, a truck, a base carried by the truck, and a vertical pivot connection between the base and the bolster.

2. A carrier for overhead transportation systems comprising a receptacle, a truck, a base plate for the truck and provided with a vertical pivot pin, a bolster in which said pin is journaled, and supporting beams for the bolster carried by the receptacle and extending from the end thereof.

3. A carrier for overhead transportation systems comprising a receptacle, a truck, a base plate for the truck and provided with a vertical pivot pin, a bolster in which said pin is journaled, and supporting beams for the bolster carried by the receptacle and extending from the end thereof, the bolster having a horizontal pivot connection with said beams.

4. A carrier for overhead transportation systems comprising a receptacle, beams extending from the end of the receptacle, a bolster extending transversely between said beams, said bolster being a channel bar, channel bars mounted cross-wise in the channel of the bolster at the ends thereof, horizontal pivot pins passing through the walls of the channel of the second-mentioned-channel bars, a connection between said pivot pins and the aforesaid beams, a truck, and a vertical pivot connection between the truck and the bolster.

5. A carrier for overhead transportation systems comprising a receptacle, beams extending from the end of the receptacle, a bolster extending transversely between said beams, said bolster being a channel bar, channel bars mounted cross-wise in the channel of the bolster at the ends thereof, horizontal pivot pins passing through the walls of the channel of the second-mentioned channel bars, a connection between said pivot pins and the aforesaid beams, a truck, a base plate carried by the truck, and a vertical pivot pin extending from the base and connected to the bolster.

In testimony whereof I affix my signature.

JOSEPH F. MONTINE.